United States Patent
Muras

(10) Patent No.: US 12,279,071 B2
(45) Date of Patent: Apr. 15, 2025

(54) VISUAL IMAGE MANAGEMENT

(71) Applicant: Brian R. Muras, Maple Grove, MN (US)

(72) Inventor: Brian R. Muras, Maple Grove, MN (US)

(*) Notice: Subject to any disclaimer, the term of this patent is extended or adjusted under 35 U.S.C. 154(b) by 374 days.

(21) Appl. No.: 17/741,817

(22) Filed: May 11, 2022

(65) Prior Publication Data
US 2023/0370565 A1 Nov. 16, 2023

(51) Int. Cl.
*H04N 7/14* (2006.01)
*G06F 3/01* (2006.01)
*H04N 7/15* (2006.01)

(52) U.S. Cl.
CPC ............ *H04N 7/144* (2013.01); *G06F 3/013* (2013.01); *H04N 7/152* (2013.01)

(58) Field of Classification Search
CPC .......... H04N 7/144; H04N 7/152; H04N 7/15; H04N 7/147; H04N 7/14; G06F 3/013; G06F 3/01
See application file for complete search history.

(56) References Cited

U.S. PATENT DOCUMENTS

| | | | |
|---|---|---|---|
| 9,762,791 B2 | 9/2017 | Deng | |
| 9,953,650 B1 | 4/2018 | Falevsky | |
| 10,368,032 B2 | 7/2019 | Visosky | |
| 10,446,055 B2 | 10/2019 | Gupta et al. | |
| 10,841,535 B2 | 11/2020 | McNelley et al. | |
| 12,026,948 B2 * | 7/2024 | Seleskerov | G06N 20/00 |
| 2020/0320478 A1 | 10/2020 | Crawford et al. | |
| 2024/0164677 A1 * | 5/2024 | Yildiz | A61B 5/168 |

OTHER PUBLICATIONS

Brighton West Video, "Eye Contact on Video Calls" last retrieved on May 9, 2022, <https://www.brightonwestvideo.com/blog/tools/eye-contact-on-video-calls/>.

* cited by examiner

*Primary Examiner* — Yosef K Laekemariam
(74) *Attorney, Agent, or Firm* — Kevin Kehe

(57) ABSTRACT

Disclosed aspects relate to visual image management associated with a set of visual images with respect to a set of computer users. A set of visual image features that relates to both the set of visual images and the set of computer users may be detected. Based on the set of visual image features that relates to both the set of visual images and the set of computer users, a set of display attributes may be determined to construct a presentation configuration associated with the set of visual images with respect to the set of computer users. The set of display attributes may be provided to construct the presentation configuration to display the set of visual images with respect to the set of computer users.

20 Claims, 5 Drawing Sheets

VISUAL IMAGE MANAGEMENT

BACKGROUND

This disclosure relates generally to computer systems and, more particularly, relates to visual image management using a set of display attributes to construct a presentation configuration. The number of visual images being presented is increasing. As the amount of visual images being presented increases, the need for visual image management using a set of display attributes to construct a presentation configuration may also increase.

SUMMARY

Aspects of the disclosure relate to visual image management associated with a set of visual images with respect to a set of computer users. A set of visual image features that relates to both the set of visual images and the set of computer users may be detected. Based on the set of visual image features that relates to both the set of visual images and the set of computer users, a set of display attributes may be determined to construct a presentation configuration associated with the set of visual images with respect to the set of computer users. In certain embodiments, the set of visual image features can be monitored and the presentation configuration may be modified consistent with a collected user profile. The set of display attributes may be provided to construct the presentation configuration to display the set of visual images with respect to the set of computer users. Aspects of the disclosure may be associated with benefits to meetings or appointments such as temporal length, effective comprehension, task performance, user productivity, or efficient communication.

In embodiments, a set of image capture arrangement features that relates a visual image capture device can be detected and a set of individual user disposition features that relates to the set of computer users can be detected. In various embodiments, eye gaze parameters may be identified pertaining to an eye gaze angle, an eye reflection factor, an eye gaze quality assessment, or the like. In embodiments, a set of candidate display attributes can be generated and the presentation configuration can be constructed using a presentation selection technique consistent with a collected user profile. In certain embodiments, a triggering event may be detected and an attentiveness mechanism may be established in a manner which is derived by using a machine-learning technique. Aspects may save resources such as bandwidth, disk, processing, or memory.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
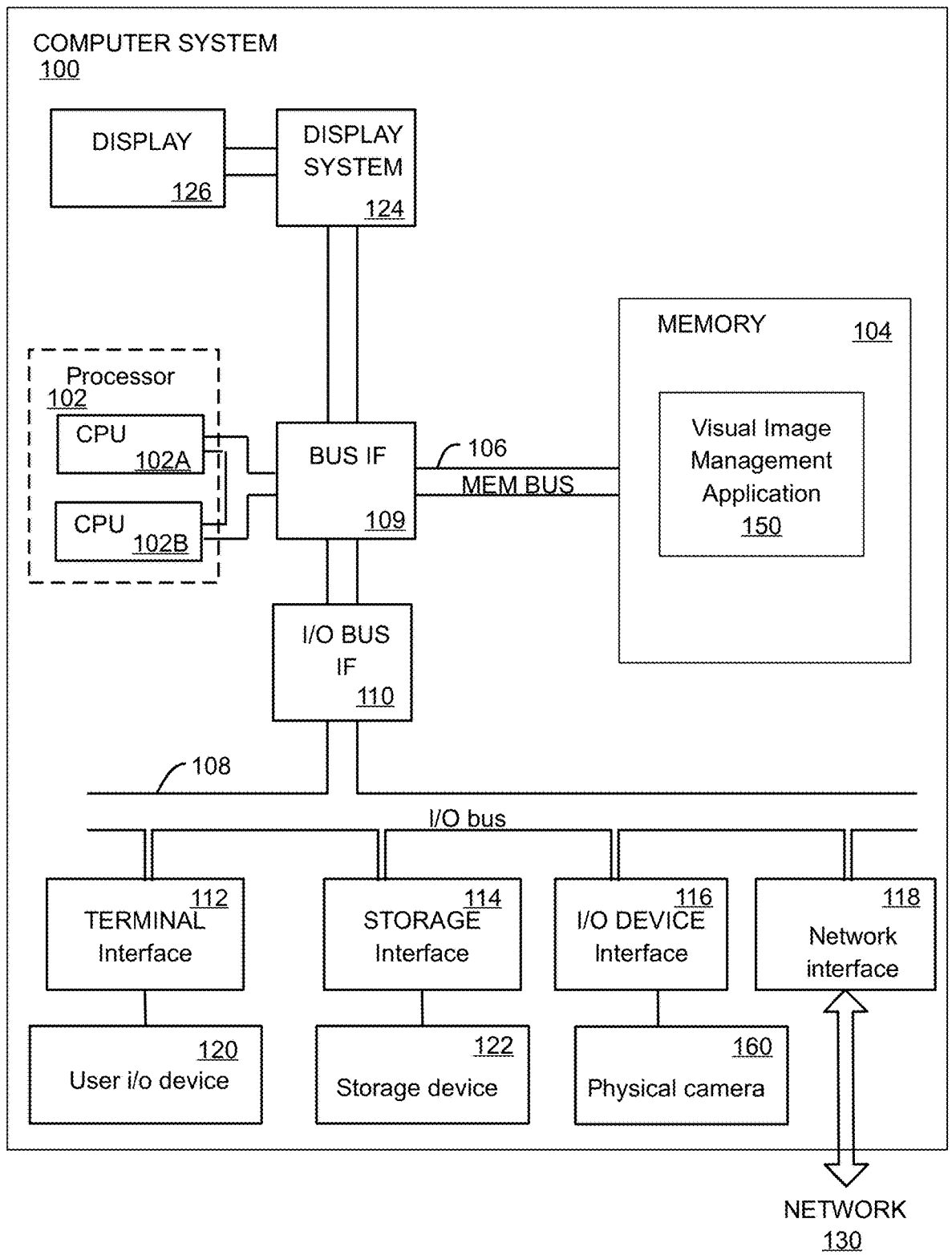
FIG. 1 depicts a high-level block diagram of a computer system for implementing various embodiments of the present disclosure, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to visual image management. The visual image management may be associated with a set of visual images (e.g., video being streamed) with respect to a set of computer users. A set of visual image features (e.g., physical camera location) that relates to both the set of visual images and the set of computer users may be detected. Based on the set of visual image features that relates to both the set of visual images and the set of computer users, a set of display attributes (e.g., on-screen presentation window customizations) may be determined to construct a presentation configuration associated with the set of visual images with respect to the set of computer users. The set of display attributes may be provided to construct the presentation configuration to display the set of visual images with respect to the set of computer users. For instance, leveraging detectable aspects of physical camera location and on-screen presentation window customizations may facilitate eye contact thereby having performance or efficiency benefits for virtual meetings.

Meetings or appointments are one method of facilitating information sharing, planning, and other types of communication between individuals or organizations. With the advance of technology, electronic meetings or appointments (e.g., conference calls, video conferences, telehealth, remote education classrooms) held between parties in physically separate locations have become increasingly common. Aspects of the disclosure relate to the recognition that, in some situations, users may not be directing their attention, eyes, or disposition to an appropriate location as the result of a physical video camera location with respect to a physical video display monitor location, distractions from multitasking with multiple on-screen presentation windows, or a single on-screen presentation window placement, arrangement, or configuration. To illustrate, eye contact may help students pay attention to teachers in a virtual school classroom, it may help teachers know how well students are comprehending the topics, it may help people feel connected in business or personal meetings, or it may help salespeople as they are presenting solutions to customers. Accordingly, aspects of the disclosure relate to detecting visual image features, determining display attributes, and providing the display attributes to construct a presentation configuration to display visual images. Aspects of the disclosure may be associated with benefits to meetings or appointments such as temporal length, effective comprehension, task performance, or efficient communication.

A challenge of virtual meetings is a loss of good eye contact. Multiple physical display monitors or multiple on-screen presentation windows per physical display monitor can exacerbate the eye contact challenge. For instance, an individual user may look at a particular on-screen window for a video conferencing application that is in an arbitrary position without considering where the physical camera is in relation to the particular on-screen window. As a result, the individual user may be appear to one or more other users in less preferred angles (e.g., side of head instead of face, forehead-level instead of eye-level). As such, achieving good or even acceptable eye contact may present challenges of predictability and reliability during video calls thereby contributing to individual user indications of relative disconnectedness with other users.

In embodiments, these types of challenges related to eye contact are addressed. For example, when a video conferencing application window first appears to a user, it may show (or play audio) such as: "let's find the best placement of your video conferencing application window." Aspects described herein may move or suggest to move one or more of the video conferencing application windows to a particular location (e.g., immediately under the physical camera on a laptop where the physical camera is on the top middle of the physical display). In certain embodiments, aspects may use a window slider bar to move a visual image of the user within a window to a suggested on-screen location, to a different physical display monitor, or it may zoom the focus in or out to a place which benefits eye contact. To illustrate, a first operation may find a location of the camera, a second operation may find the location of the video conferencing application window, a third operation may compute an assessment of eye contact, and a fourth operation may carry-out an automated action or present a suggested manual action which may benefit eye contact.

Aspects of the disclosure relate to a system, method, and computer program product for visual image management associated with a set of visual images with respect to a set of computer users. A set of visual image features that relates to both the set of visual images and the set of computer users may be detected. In embodiments, a set of image capture arrangement features that relates a visual image capture device can be detected and a set of individual user disposition features that relates to the set of computer users can be detected. Based on the set of visual image features that relates to both the set of visual images and the set of computer users, a set of display attributes may be determined to construct a presentation configuration associated with the set of visual images with respect to the set of computer users. In embodiments, a set of candidate display attributes can be generated and the presentation configuration can be constructed using a presentation selection technique. The set of display attributes may be provided to construct the presentation configuration to display the set of visual images with respect to the set of computer users. Altogether, aspects of the disclosure can have performance or efficiency benefits (e.g., data communication reliability, speed, flexibility, responsiveness, productivity). Aspects may save resources such as bandwidth, disk, processing, or memory.

Turning now to the figures, FIG. 1 depicts a high-level block diagram of a computer system for implementing various embodiments of the present disclosure, according to embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store a visual image management application 150. In embodiments, the visual image management application 150 may include instructions or statements that execute on the processor 102 or instructions or statements that are interpreted by instructions or statements that execute on the processor 102 to carry out the functions as further described below. In certain embodiments, the visual image management application 150 is implemented in hardware via semiconductor devices, chips, logical gates, circuits, circuit cards, and/or other physical hardware devices in lieu of, or in addition to, a processor-based system. In embodiments, the visual image management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers, fax machines, or a physical camera 160. The physical camera 160 may be integrated with the computer system 100 or external to the computer system 100. Other possibilities with respect to the physical camera 160 are contemplated. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

Figure 2:
FIG. 2 is a flowchart illustrating a method of visual image management, according to embodiments.

FIG. 2 is a flowchart illustrating a method 200 for visual image management associated with a set of visual images with respect to a set of computer users, according to embodiments. The set of visual images may include a still image, a screenshot, a photograph, a video clip, a video stream, a recorded video, a dynamic video (e.g., live, real-time), or the like. The visual images can depict a person (or an animal such as a pet dog or a pet cat) having eyes, cheeks, a chin, a nose, a forehead, or attire such as glasses, sunglasses, jewelry, a headband, or a hat. Accordingly, the set of computer users can include a person or individual pertaining to a computer login handle, software identifier, hardware identifier, physical location (e.g., GPS), internet protocol address, media access control address, port address, blockchain identifier, institution identifier (e.g., employee number, student number), or the like. In certain embodiments, the set of computer users can include an anonymous user or an unknown user. The set of computer users may be within a group of users (e.g., same corporation, same school, same phone communications network provider) or across a varied group of users (e.g., patient-doctor, different families, different cloud service network providers). The method 200 may begin at block 201.

At block 220, a set of visual image features is detected. Detecting can include sensing, recognizing, discovering, identifying, or otherwise ascertaining one or more features of a visual image. A computer, still image camera, video camera, electronic apparatus, or other similar device or machine may be utilized to perform the detection. The computer or other detection device may pertain to the set of visual images with respect to the set of computer users. Generally, the set of visual images may include the individual/user whose image is being captured but can also encompass the another individual/user that is part of the conference/call. The set of visual images can include initial/input still images/video which are captured, or output still images/video which are displayed. The set of visual images may include video conferencing on-screen windows, icons, blinking/flashing items, or other added aspects. In certain embodiments, the set of visual images can include an anticipated set of images (e.g., at startup of computer or video conferencing application to anticipate a forthcoming still image or video). For instance, a smartphone camera may capture a visual image of a user of the smartphone (e.g., the user is about to initiate a video call) or a computer video conference application may obtain an incoming visual image of a different user from the user of the computer (e.g., a healthcare professional is receiving a video meeting request from a patient or another healthcare professional).

The set of visual image features relates to both the set of visual images and the set of computer users. The set of visual image features can include a camera location, eye gaze, various angles and relationships, facial feature positions (e.g., head, eye), foreground information (e.g., speaking individual in a crowd), background information (e.g., traveling on a bus), profile information, metadata (e.g., generalized information which is applicable in various circumstances such as buffering time or available memory), or the like. For instance, a particular user who there is a profile of visual image features for can be detected (e.g., for a special needs student in a virtual classroom, a telehealth doctor who tends to be looking at a different screen rather than the physical video camera). The set of visual image features can be located on the computer/server of any party to the meeting with varying preferences. As such, the set of visual image features may be for or based on the user of the computer (e.g., for the individual themselves in most any meeting) or the set of visual image features may be for or based on a different user (e.g., specific arrangements when video conferencing with this particular other party).

In embodiments, detection may occur with respect to a visual image capture device that relates to the set of computer users. The visual image capture device can include an included physical camera on a tablet, monitor, or smartphone. The visual image capture device can include a distinct physical camera that may communicate with the computer. The visual image capture device may relate to the set of computer users by such communication, via inputs (e.g., images acquired/processed), via outputs (e.g., images processed/displayed), via identifiers, or via various hardware/software mechanisms. In embodiments, a set of image capture arrangement features that relates to the visual image capture device may be detected at block 221. The set of image capture arrangement features may have a physical location of a camera (e.g., top of the monitor, left side of the tablet, center dashboard of the car), a zoom level of a camera (e.g., zoomed-out for a wide view with clear resolution, zoomed-in for a tightened view with more pixelation), a filtration technique of a camera (e.g., grayscale, blue tint, emphasize foreground resolution while blurring background resolution, neutral density technique, polarization technique, diffusion technique), or the like.

In embodiments, a set of individual user disposition features that relates to the set of computer users may be detected at block 222. The set of individual user disposition features can include various dispositions of body parts or attire such various eye contact, eye gaze, eye movement, blink rates, speaker/listener, speed of mouth movement, gestures, foreground/background location, physical movement toward/away-from camera, leaning-in, raised hand, singing, response to noise/light, or the like. The set of individual user disposition features can have various arrangements, placements, locations, or focal points related to body parts, attire, or the like. Behavior, sentiment, or body language recognition techniques may be utilized to detect individual user disposition (e.g., head in palms, chin resting on fist, head scratching, head nodding, dancing). In certain embodiments, such techniques may be used in context of an ongoing chat session (e.g., emoji usage). The chat session may include chat sessions configured to be part of a video conference (e.g., on-screen with one or more users of the video conference) or may include chat sessions separate from the video conference (e.g., the user is discussing the subject matter distinct from the video conference with related/unrelated users).

In embodiments, a set of eye gaze parameters with respect to the set of computer users may be identified at block 231. Generally, identifying can include recognizing, sensing, discovering, acquiring, obtaining, resolving, calculating, computing, or otherwise ascertaining. The set of eye gaze parameters may include general eye contact, qualitative eye contact, quantitative eye contact, eye gaze angles, or the like. The set of eye gaze parameters can include an eye gaze activity factor which may quantitatively have a set of values for what an individual is looking at, how eyes move, or other visual behavior. Measurements of directions of eye movement or predictions of locations of objects that may be looked-at may occur. Such measurements may have various coordinates for spatial locations, or the like. Other possibilities include a set of values of measurements/ratios related to an eye gaze focus factor (e.g., where/what/who/when), an eye gaze duration factor (e.g., how long does a stare last), various eye gaze angle measurements/factors, and the like. In certain embodiments, one or more users may be presented with an opportunity to rate or assign a score for the eye contact of other users in a manual fashion (e.g., during a presentation/meeting to assist in eye contact on-the-fly, before a presentation/meeting when unfamiliar with a particular hardware/software/environmental configuration, after a presentation/meeting to build a profile to assist in future presentations/meetings).

In embodiments, a set of user relevance parameters with respect to the set of computer users may be identified at block 236. The set of user relevance parameters can pertain to a level of materiality of a particular user (e.g., words spoken by a teacher, words spoken by a teaching assistant, words spoken by a student with excellent grades in a database, words spoken by a student who the teacher has previously flagged that the student tends to ask quality questions) or a particular topic with respect to the video conference (e.g., a tangential question/joke, a directly related question/statement of fact). Various relevance/materiality levels/factors may be utilized to discern an individual user among multiple users to primarily utilize or focus on (e.g., previous/current/next speaker, frequent/infrequent speaker, foreground/background individual in the presentation, logged-in user of the hardware/software, organizer of the meeting/call, facial recognition techniques to use an identifier of the owner of the device, or database driven organizational hierarchy such as a highest ranking individual in a human resources database).

At block 250, a set of display attributes is determined. Generally, determining can include establishing, computing, resolving, formulating, calculating, selecting, identifying, or otherwise ascertaining the set of display attributes. The set of display attributes may be utilized to construct a presentation configuration associated with the set of visual images with respect to the set of computer users. The set of display attributes may include a location of where to put the image/video window, various coordinates (e.g., relative to an on-screen presentation), suggested actions, zooming in/out, crop, resize, scaling, attention-grabbers (e.g., blinking, flashing), temporal duration of actions (e.g., temporal length of blinking, temporal length of time suggested actions are presented for manual selection before automated selection), eye contact quality, or various other types of metrics/factors. The set of display attributes can include visual image enhancements, filters, artistic overlays, modifications, or distortions (e.g., an overlay of a rainbow, artificial eye contact such as by altering an eye image). The set of display attributes may be based on the set of visual image features (e.g., in response to the detection of the set of visual image features) that relates to both the set of visual images and the set of computer users. For example, detected visual image features such as eye contact quality may be utilized to determine the set of display attributes to position/reposition the on-screen location of the on-screen video conferencing application/image window (e.g., to place an eye focal point of a user nearer to the physical camera, to draw attention of a user nearer to the physical camera). The presentation configuration may include a display layout/arrangement (e.g., which applications arranged to be on which monitors and corresponding positions), an on-screen window positioning (e.g., position window of video of person communicating with relative to physical camera), addition/modification of elements such as icons, text, or images, or the like. The determined set of display attributes and related appropriate/selected/constructed presentation configuration may include a collection of settings, regulations, stipulations, or parameters that define a display/output configuration/arrangement/layout for the visual image management that is ascertained to be suitable (e.g., based on a profile, based on a priority weighting, based on a user selection) with respect to the security, performance, or other factors of the operational environment (e.g., telehealth, virtual education, business conferencing, military communications, weather, geo-location).

At block 280, the set of display attributes is provided, using the computer, to construct the presentation configuration to display the set of visual images with respect to the set of computer users. Generally, providing can include presenting, displaying, sending, conveying, exhibiting, or supplying the set of visual images or data corresponding to the set of visual images. In certain embodiments, the set of display attributes is provided in response to determining the set of display attributes and in advance of constructing the presentation configuration. Accordingly, elements may facilitate a dynamic, an automated, or a user-driven manual (e.g., based on suggested actions) operation of aspects described herein.

Method 200 concludes at block 299. Aspects of method 200 may provide performance or efficiency benefits for visual image management (e.g., data communication reliability, speed, flexibility, responsiveness, productivity). Aspects may save resources such as bandwidth, disk, processing, or memory (e.g., storing less data, transferring less data). For example, aspects of method 200 may be associated with benefits to meetings or appointments such as temporal length, effective comprehension, task performance, user productivity, or efficient communication.

Figure 3:
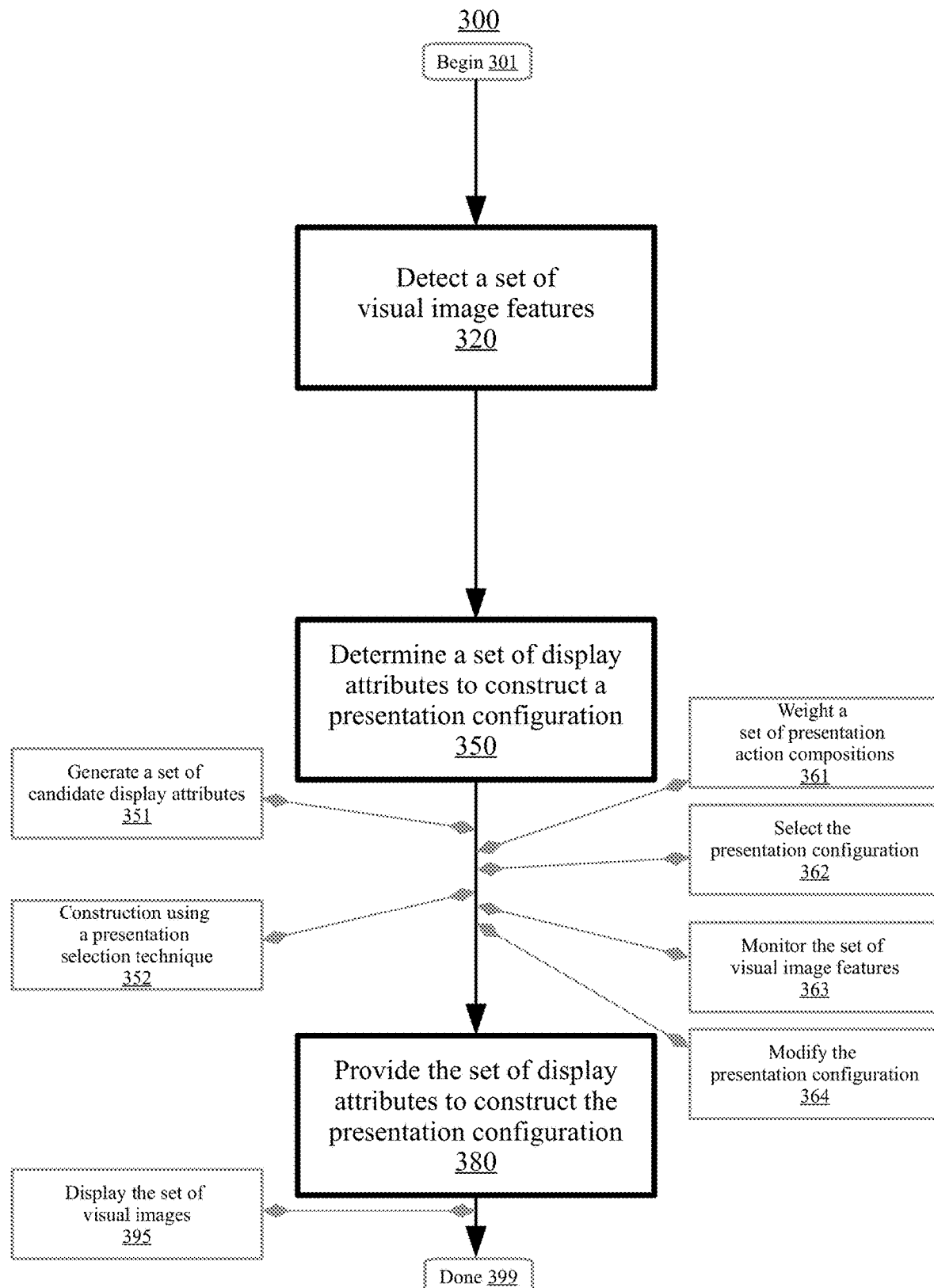
FIG. 3 is a flowchart illustrating a method of visual image management, according to embodiments.

FIG. 3 is a flowchart illustrating a method 300 for visual image management, according to embodiments. Aspects of FIG. 3 may substantially correspond to other embodiments described herein and shown in the FIGS. 1-5. The method 300 may begin at block 301. The method 300 may include a detecting block 320 to detect a set of visual image features and a determining block 350 to determine a set of display attributes to construct a presentation configuration.

In embodiments, a set of candidate display attributes is generated at block 351. Generally, generating can include producing, computing, formulating, calculating, assembling, structuring, assigning, establishing, or otherwise creating the set of candidate display attributes. The set of candidate display attributes may be based on the set of visual image features that relates to both the set of visual images and the set of computer users. The set of candidate display attributes can include the weighting of various visual image features, users, machines, hardware components, or the like to render options/possibilities for selection/automation. In various embodiments, the set of candidate display attributes can include one or more aspects of the set of display attributes (e.g., window location, suggested actions, visual image enhancements). In certain embodiments, a single candidate display attribute may be appropriate and aspects described herein are automatically performed in response to the single candidate display attribute. To illustrate, an on-screen suggestion may be generated which indicates to move an object (e.g., adjust/move hardware "move device closer to you", reposition a physical camera such as "up one inch", tilt a physical display monitor such as "tilt display screen up and to the left"), move an on-screen window to a different location (e.g., a location which as performance/efficiency benefits), to move a focus point in a window (e.g., by moving a slider bar), or to adjust to a different zoom level. Other possibilities for on-screen suggestions in advance of user intervention can include a crop, a resize, or a scale. The set of candidate display attributes may indicate a move or offer to move the window or focus point or zoom in/out or crop, resize, or scale the video image for the user. In certain embodiments, the focus point, on-screen window. or zoom level may continuously or periodically adjust if the user moves or changes location or disposition.

In embodiments, the presentation configuration is constructed using a presentation selection technique at block 352. The construction may occur in response to generating the set of candidate display attributes and in advance of displaying the set of visual images. Generally, constructing can include assembling, building, composing, creating, structuring, or otherwise establishing the presentation configuration. In various embodiments, a selection may be received from an individual user. In embodiments, profiles of users may be utilized to carry-out selection based on particular users having preferences of various options (e.g., based on who is being communicated with, based on the sensitivity of the subject matter). Using the weighting of various candidate display attributes or user profiles, aspects may be performed in a dynamic or automated fashion.

In various embodiments, a set of presentation action compositions may be weighted at block 361. Generally, weighting can include prioritizing, emphasizing, biasing, accentuating, or assigning greater priority/preference. The set of presentation action compositions may be weighted using the set of candidate display attributes. The set of presentation action compositions can include various elements, combinations, or permutations of candidate display attributes in an arrangement, format, layout, or structure for selection. The set of presentation action compositions may be weighted to customize the set of visual image features (e.g., tailored for camera locations, head positions, eye gaze angles).

In various embodiments, the presentation configuration may be selected at block 362. Generally, selecting can include choosing, picking, electing, specifying, or designating the presentation configuration. The presentation configuration may be selected to customize the set of visual images with respect to the set of computer users (e.g., tailored for particular visual images or users). The selection may be based on the set of presentation action compositions to customize the set of visual image features. The selection may be user-selected (e.g., receiving a response after a menu prompt with option) or automated (e.g., based on a user-profile of one or more parties to the conversation, based on the hardware involved, based on the time of day, based on the amount of light).

In various embodiments, the set of visual image features may be monitored at block 363. The set of visual image features may be monitored with respect to the presentation configuration. Generally, monitoring can include tracking, listening, observing, checking, watching, detecting, recognizing, or discovering. For instance, user may move or change location (e.g., riding in/on a car/bus/plane and various conditions such as lighting, weather, or nearness to a physical camera changes). A score or metric may indicate a change in the overall/whole video conference quality, the immediate quality, the moving average of the last several seconds or minutes quality, the quality compared to a historical average of quality, or the like.

In various embodiments, the presentation configuration may be modified at block 364. Generally, modifying can include adjusting, altering, revising, or changing. The presentation configuration may be modified using the presentation selection technique with respect to the set of candidate display attributes. The monitoring may detect a change in visual image features (or some other triggering event) and the presentation selection technique may respond by offering a new menu to the user, automatically making changes to the on-screen window, or otherwise carrying-out/offering a modification. Aspects may be performed in a dynamic (e.g., streamlined, on-the-fly) or automated fashion.

For example, a video conferencing application on-screen window can include a sub-window video of a first user along with a sub-window video of a second that the first user is communicating with. Some users may have habit of staring at their own video as opposed to making sustained eye contact with the video of the person that they are speaking with. In certain embodiments, the presentation selection technique may automatically move or suggest to the first user to move the visual image of the first user picture closer to the physical location of the camera (as opposed to the visual image of the second user). In other embodiments, the presentation selection technique may indicate to close the on-screen window of the first user altogether (e.g., close the on-screen viewing window of themselves altogether to avoid the distraction of looking at themselves). In various embodiments, the presentation selecting technique may indicate to partially overlay the two sub-windows in a way that arranges both visual images of the faces of the users near to the physical location of the camera. As such, the overlayed portion may be selected in a fashion such that meaningful pictorial data is not lost (e.g., by analyzing the visual images to ascertain portions of the on-screen windows having images of one or more individual users based on facial features or attire, or background aspects such as a green screen or an outdoor landscape).

The method 300 may include a providing block 380 to provide the set of display attributes to construct the presentation configuration. Using the presentation configuration, the set of visual images (e.g., anticipated visual images, still images, real-time video images, attention-grabbers such as lights/text/icons) may be displayed (e.g., illustrated, conveyed, visually represented, exhibited, presented) at block 395. The set of visual images may be displayed with respect to the set of computer users (e.g., visual image of a first user displayed to a second user). Method 300 concludes at block 399.

Figure 4:
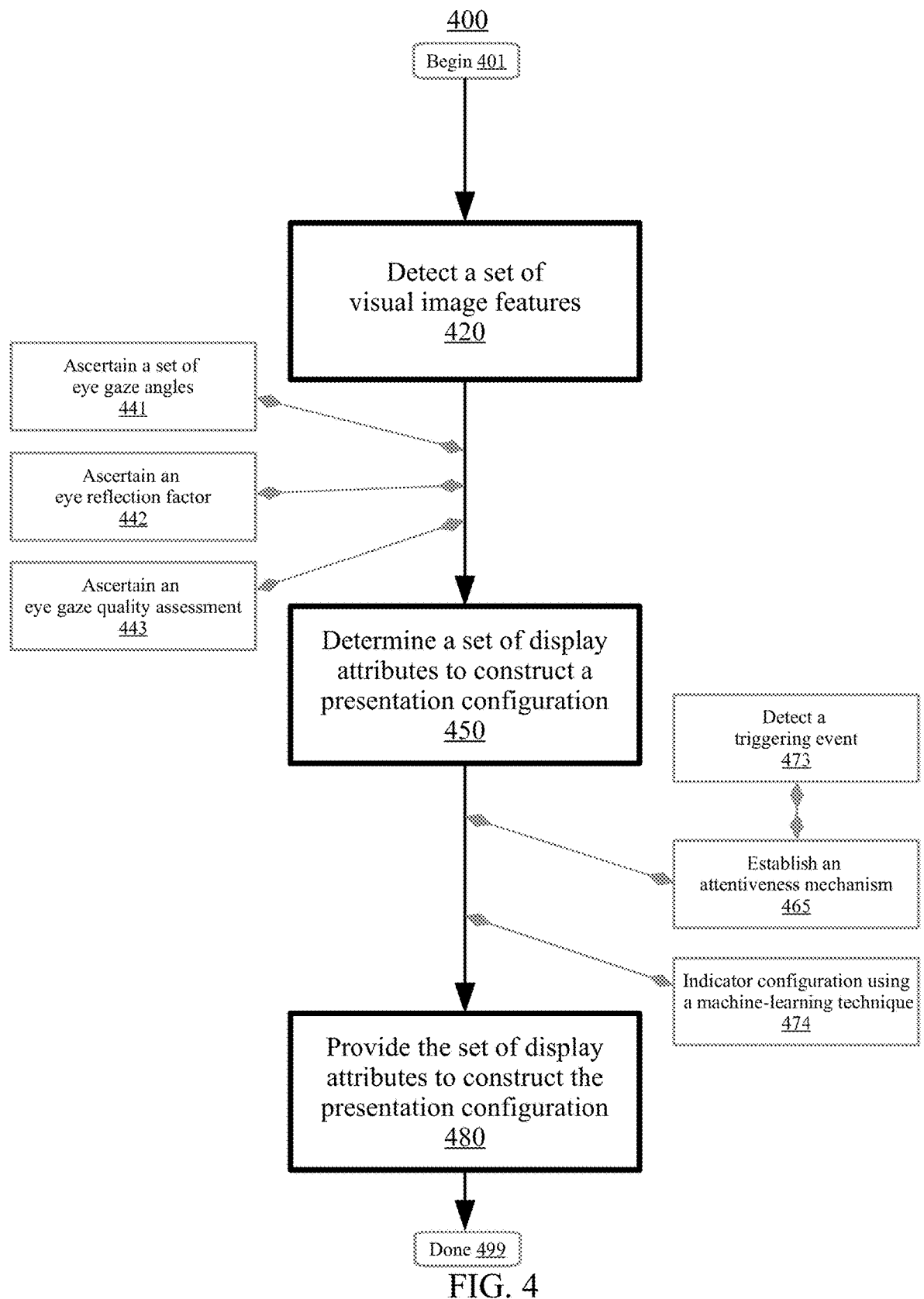
FIG. 4 is a flowchart illustrating a method of visual image management, according to embodiments.

FIG. 4 is a flowchart illustrating a method 400 for visual image management, according to embodiments. Aspects of FIG. 4 may substantially correspond to other embodiments described herein and shown in the FIGS. 1-5. The method 400 may begin at block 401. The method 400 may include a detecting block 420 to detect a set of visual image features.

In embodiments, a set of eye gaze angles may be ascertained at block 441. Ascertaining can include determining, computing, resolving, calculating, estimating, or establishing. The set of eye gaze angles can be ascertained to identify the set of eye gaze parameters with respect to the set of computer users. A first eye gaze angle with respect to a first object may be ascertained. A second eye gaze angle with respect to a second object may be ascertained. Based on both the first eye gaze angle and the second eye gaze angle, the set of display attributes may be determined. The first and second objects can include a tangible object such as the camera or an intangible object such as an on-screen application window, icon, visual image, or the like. For example, an eye contact quality may be computed or approximated based on the angle of the gaze compared to the angle of directly looking at the camera. In a single monitor/screen output, the angle of the gaze between the camera to the on-screen window can be calculated or approximated directly. With multiple monitors/screens, various techniques such as from the display layout on an arrangements tab (e.g., on the operating system settings/options) and an angle from the camera (e.g., on a laptop) to the on-screen video conferencing application window can be calculated or approximated. In various embodiment, an artificial intelligence model may be trained on various different head or eye positions along with the direction or angle that the individual is looking. Next, real-time images of the user can be passed to the trained model to calculate/approximate which way the user is looking, and thereafter to compute the angle of gaze.

In embodiments, an eye reflection factor may be ascertained at block 442. The eye reflection factor can be ascertained to identify the set of eye gaze parameters with respect to the set of computer users. The eye reflection factor may be associated with the set of visual images (e.g., an on-screen application window, a reflection of a certain color/image, on-screen blinking/flashing, physical camera light going on/off or moving). The eye reflection factor may include aspects already in/on the existing images or could be ascertained using a generated color, blinking, flashing, icon, image, text, or other attention-grabbing mechanism. For example, an initial computation may be calculated by observing the eye from the camera, and an angle of eye direction may be computed or approximated at various temporal intervals or times (e.g., when the user clicks to start the video conference in an on-screen application window or using a button in the on-screen application window) and also from a reflection of a certain color or blinking color (from the on-screen application window) off the eye. Since the location/coordinates of the on-screen application window is known, the angle from the eye reflection or direction can be computed, and thus the location of the camera can be determined/inferred (e.g., with a standalone camera). Aspects may be repeated to fine tune outputs. For instance, multiple such computations may be made at slightly different observed eye gazes (or with different reflection factors/mechanisms) within the on-screen application window to help solidify the results (e.g., the exact location of the camera, on-screen window placement).

In embodiments, an eye gaze quality assessment may be ascertained at block 443. The eye gaze quality assessment can be ascertained to identify the set of eye gaze parameters with respect to the set of computer users. The eye gaze quality assessment may be for the immediate session only, be based on historical sessions, or a combination thereof. The eye gaze quality assessment may utilize aspects described herein to identify various eye gaze angles, a temporal duration looking at a particular object, a reflection, a response to an attention-grabbing mechanism, or the like. In various embodiments, an eye contact score/metric may be computed (e.g, and displayed in a corner of an on-screen window). The eye gaze quality assessment displayed/provided/shown as a percentage, color (green/yellow/red) based on quality, graph, or the like. As the eye gaze quality assessment worsens, it may be provided/displayed more prominently (e.g., it may be shown in a more obvious manner such as visual image presentation modifications, changing colors, varying sizes, zoom levels, or predetermined/random blinking/flashing positions/coordinates as it deteriorates). In certain embodiments, a score or metric may indicate a change in the video conference quality, the immediate quality, the moving average of the last several seconds or minutes quality, the quality compared to a historical average of quality, or the like. In various embodiments, an assessment, factor, score, metric, or the like may update dynamically. For example, when a video conferencing window is first displayed, a gaze score may be displayed. After a few seconds, the score may slowly disappear. In response to the user subsequently beginning to drag their window with their mouse (or other input device), the gaze score may reappear and be dynamically updated as the user moves the window. As such, the user may be informed that the gaze score is getting better/worse as they drag the window across one or more computer screens. When the user stops moving the window, the gaze score may remain/ stay there for a period of time, and then again slowly fade/disappear.

The method 400 may include a determining block 450 to determine a set of display attributes to construct a presentation configuration. In embodiments, an attentiveness mechanism may be established at block 465. Generally, establishing can include creating, instantiating, formulating, constructing, building, assembling, structuring, producing, or otherwise generating. The attentiveness mechanism may be established using the set of candidate display attributes (e.g., to increase the likelihood of eye contact). The attentiveness mechanism may be established for the purpose of triggering the attention of a particular user (e.g., blinking, flashing, emoji, vibration, sound such as beeping, light on/off, color change, word/phrase, varying duration of such). For example, a camera light which is adjacent to a camera may blink, a smartphone vibrate, one or more pixels may flash, a notification may appear on a portion of the on-screen window that is near to the camera, a word/phrase/image/ combination may be displayed to attempt to cause/trigger the user to glance/look at the camera. In certain embodiments, the duration (e.g., in the range of milliseconds) of the action may be so temporally insignificant/short that it may go unnoticed by some users (or at least minimally noticed so as not to disrupt the video conference in process). Using the attentiveness mechanism to trigger user attention, the presentation configuration may be constructed.

In embodiments, a triggering event may be detected at block 473. The attentiveness mechanism to trigger user attention may be established in response to detecting the triggering event. Detection of the triggering event may indicate achievement of a user attentiveness indicator. The user attentiveness indicator can have a threshold period of time, number of specific words/phrases/questions, sentiment change counts, number of users with poor eye contact, or the like. In embodiments, the triggering event can include various cues such as keyphrases/keywords being spoken/ heard/ingested/sensed, a question being sensed, sentiment detection (e.g., anger, sadness, curiosity, joy/laughter), sentiment change, a pause, a period of silence, prolonged poor eye contact, or the like. A natural language processing technique may be utilized. For example, a triggering event may occur in response to prolonged poor eye contact of one or more users and natural language processing detection of a phrase (e.g., a question to a particular individual "what do you think Joe?", a broad question such as "do you know what I mean?", a name of a group "OK everyone", certain phrases such as "I need the attention of everyone"). In certain embodiments, an audio/volume change mechanism/ technique may be utilized. For example, a triggering event may occur in response to an audio/volume change (e.g., on, off, mute, level higher/up, level lower/down, intonation such as treble/bass, speaker weighting front/back, speaker weighting left/right, sound type adjustment such as music/ talk which may indicate a video conference is changing from background music to topical discussion) with respect to a threshold amount/level (e.g., more than 3 levels, exceeds level 12, muted, more than 75% to the front speakers, music fades out below level 6).

To illustrate, a device, such as a cell phone, may be displaying a video call between participants. Aspects described herein may detect that a user of the cell phone is displayed in the window and may detect information associated with the eyes, face, head, or other information corresponding to the user. Aspects described herein may determine display attributes such as the positioning of the window. In various instances, the positioning of the window may be fixed, set by the operating system of a phone, or otherwise outside of control of the application. An attentiveness mechanism such as a vibration, a soft sound, and/or display of an icon (e.g., eye icon, camera icon) to trigger user attention may be established or configured to activate if a triggering event occurs. The presentation configuration may be constructed with the attentiveness mechanism. A triggering event may be detected such as a natural language word, word phrase, or sentence, such as, "Please listen carefully", "May I have your attention", or the like. Alternatively (or in conjunction with the aforementioned natural language detection), an eye gaze quality may be scored (e.g., dynamically/continually scored). If a poor eye gaze quality score, or poor eye gaze aggregation score (e.g., moving average score over the last 5 seconds) is observed for a threshold amount of time (e.g., the most recent 10 seconds), it may be an indication of the user not maintaining quality eye contact. Thus, the attentiveness mechanism may be activated (e.g., vibration, beep, display of an icon) causing the user to glance or look in the direction of the camera. Accordingly, the eye gaze score may be changed (e.g., improved) or the conversation may be more productive.

In embodiments, a machine-learning technique may be used to configure the user attentiveness indicator at block 474. Configuring can include setting-up, programming, instructing, modifying, or structuring the user attentiveness indicator or an associated achievement threshold. The attentiveness mechanism may be determined/selected based on the user attentiveness indicator. In certain embodiments, multiple attentiveness mechanisms may be used concurrently or in sequence (e.g., based on information arising out of use of the machine-learning technique). To illustrate, a threshold for achievement may be altered based on a specific user, a threshold for achievement may be monitored over time within a given conversation/meeting, more/less intense attentiveness mechanisms/actions may be performed (e.g., globally across usage of the attentiveness mechanism or specific to a set of users) based on data analysis resulting from usage of the machine-learning technique.

For instance, the eye contact of a user may be trained over time based on certain cues (e.g., mentioning the name of the user causes a small blink next to the camera). The user may learn to look at the camera (where a blink had previously been observed) when they hear their name during the call. Aspects of the machine-learning technique could attempt various techniques/mechanisms to determine whether the user had changed behavior when the various cues occurred. In certain embodiments, the user attentiveness indicator may be configured to randomly not to take an action (e.g., when hearing the name of the user) to ascertain whether the eye contact of the user improves without a prompt. If the eye contact is improving, the machine-learning technique may indicate to lower the threshold of the user attentiveness indicator as to when an action is initiated to trigger improved eye contact. Such outcomes may feed back into configuring/ setting the appropriate sliding scale values for different users, or learning the best suggestions/actions for sets of users. The method 400 may include a providing block 480 to provide the set of display attributes to construct the presentation configuration. Method 400 concludes at block 499.

Figure 5:
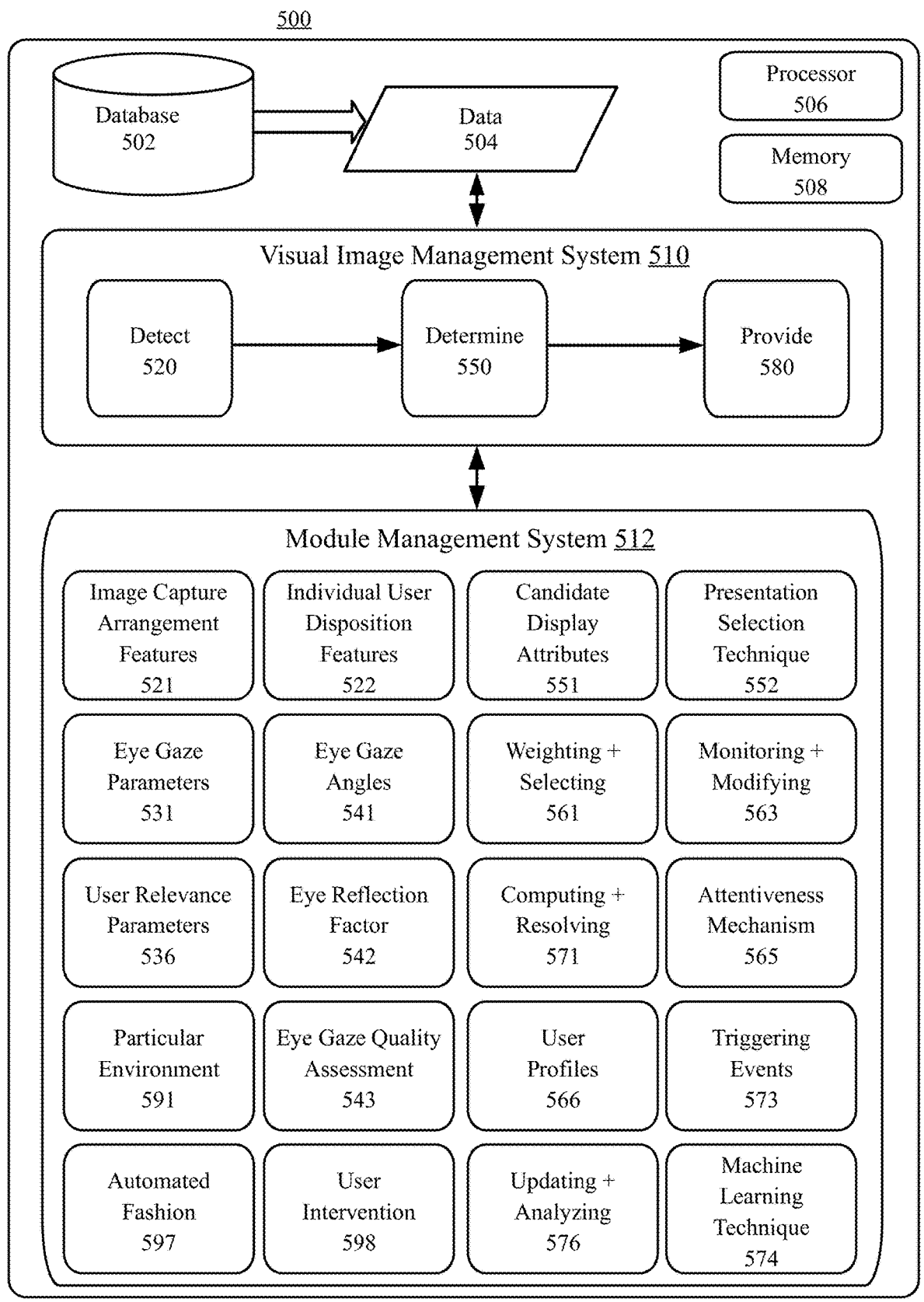
FIG. 5 is an example system of visual image management, according to embodiments.

FIG. 5 is an example system 500 for visual image management, according to embodiments. Aspects of FIG. 5 may substantially correspond to other embodiments described herein and shown in the FIGS. 1-5. The example system 500 may include a processor 506 and a memory 508 to facilitate implementation of visual image management. The example system 500 may include a database 502 (e.g., visual image database, user profile database). In embodiments, the example system 500 may include a visual image management system 510. The visual image management system may be communicatively connected to the database 502, and be configured to receive data 504 related to a set of visual images with respect to a set of computer users. The visual image management system 510 may include a detecting module 520 to detect a set of visual image features, a determining module 550 to determine a set of display attributes, and a providing module 580 to provide the set of display attributes. The visual image management system 510 may be communicatively connected with a module management system 512 that includes one or more modules for implementing aspects of visual image management. The module management system 512 may include an image capture arrangement features module 521, an individual user disposition features module 522, an eye gaze parameters module 531, a user relevance parameters module 536, an eye gaze angles module 541, an eye reflection factor module 542, an eye gaze quality assessment module 543, a candidate display attributes module 551, a presentation selection technique module 552, a weighting and selecting module 561, a monitoring and modifying module 563, an attentiveness mechanism module 565, a triggering events module 573, and a machine-learning technique module 574.

In embodiments, the module management system 512 may include a user profiles module 566 to collect a set of user profiles. Using the set of user profiles, the set of candidate display attributes may be generated. The set of user profiles may be collected based on the set of visual image features that relates to both the set of visual images and the set of computer users. Generally, collecting can include acquiring, gathering, obtaining, amassing, assembling, compiling, capturing, accumulating, or otherwise aggregating. Collection may be individualized by user/location/hardware system, may be at a higher-level such as globally of all users on the platform, may be at various scales in-between, or the like. Collection may be centralized on a server separate from a computer of a user, may be distributed across computers of various users, or a combination thereof.

For example, a set of user profiles of different individual users may be collected. The set of user profiles may track whether and how much the suggestions, actions, or selections described herein resulted-in performance or efficiency benefits for eye contact or attentiveness over time (e.g., performance benefits of different candidate display attributes such as shorter/efficient meetings leading to less memory usage). When the suggestions, actions, or selections were less helpful, the aspects described herein may lower a threshold of when to invoke suggestions, actions, or selections (e.g., attentiveness mechanism/indicator) or it may not use a particular action/selection if it is not helpful for a user, and it may decide to use a different action (e.g., change zoom level instead of image filtration). Conversely, when the suggestions or actions are helpful it may be more aggressive at performing suggestions, actions, or selections or may use an action which works better over other actions (e.g., overlaying on-screen window arrangement near physical camera). Similarly, a more beneficial duration of actions may be machine-learned over time. For instance, a short, hardly noticeable action may be helpful for a first user (e.g., millisecond change in hue of color of light on physical camera), but for a second user, the aspects described herein may increase the duration of an action to help the user notice it, and improve their eye contact (e.g., change color of light on physical camera for seconds at a time in a random rotation of colors of the rainbow).

In certain embodiments, a sliding scale may be implemented with respect to the set of user profiles. As aspects described herein machine-learn that an increase/decrease in the action/duration may provide performance or efficiency benefits (e.g., for a given user), a value on the sliding scale may be selected by moving the slider in that direction. Aspects described herein may automate the value in certain embodiments (e.g., for a majority of global users), and in other embodiments the user may be able to adjust or override a selected value, and set the slider as the user selects/prefers (e.g., when a user profile indicates a machine-learned preference for a specific user for a particular presentation configuration that is different). To illustrate, in addition to learning what helps each individual user, aspects described herein may collect statistics at a global level and determine which actions are most helpful for most users across the set of user profiles. In various embodiments, aspects described herein may select/prefer a suggestion, action, suggestion, or a duration of an action over others due to machine-learning globally across all users, a subset of all users, a subset of a subset, or the like (e.g., based on geography, country, industry, disability, age, education/credential level, proficiency level using a particular application). For instance, the set of user profiles may be utilized to force an individual user to use aspects described herein to improve eye contact perhaps based on roles (e.g., fourth grade students a virtual school environment), whereas the set of user profiles may indicate an option of disabling the suggestions, actions, or selection at the selection/preference of the individual user (e.g., business colleagues who meet weekly).

In embodiments, the module management system 512 may include an updating and analyzing module 576 to update and analyze the set of user profiles. The set of user profiles may be updated (e.g., revised) based on the set of visual image features that relates to both the set of visual images and the set of computer users (e.g., dynamic changes related to the background of a video feed, more participants joining a video conference). For instance, analyzing can include extracting (e.g., creating a derivation), examining (e.g., performing an inspection), scanning (e.g., reviewing a sample), evaluating (e.g., generating an appraisal), dissecting (e.g., scrutinizing an attribute), resolving (e.g., ascertaining an observation/conclusion/answer), parsing (e.g., deciphering a construct), querying (e.g., asking a question), searching (e.g., exploring for a reason/ground/motivation), comparing (e.g., relating an assessment), classifying (e.g., assigning a designation), or categorizing (e.g., organizing by a feature). Data analysis may include a process of inspecting, cleaning, transforming, or modeling data to discover useful information, suggest conclusions, or support decisions. Data analysis can extract information/patterns from a data set and transform/translate it into an understandable structure (e.g., a data report which can be provided/furnished) for further use to customize a modification. The set of user profiles may be analyzed to customize a modification. The modification may be individualized for a specific user or could be generally applied globally if analyzed/determined to be helpful for a plurality/majority of users or may be tailored based on demographic user information (e.g., age, internet protocol address, country, industry, disability/wellness/health challenge status, language spoken, eye color) to determine the modification or proposed modification. In response to both updating the set of user profiles and analyzing the set of user profiles, a modified set of candidate display attributes may be generated.

In embodiments, the module management system 512 may include a computing and resolving module 571 to compute eye gaze scores for candidate presentation action compositions to resolve a single candidate presentation action composition to select. Generally, computing can include formulating, calculating, ascertaining, measuring, estimating, or otherwise determining. Using the set of candidate display attributes, a first expected eye gaze score may be computed for a first candidate presentation action composition which includes a first arrangement of real-time streaming video communication windows with respect to a physical distance of an object. Using the set of candidate display attributes, a second expected eye gaze score may be computed for a second candidate presentation action composition which includes a second arrangement of real-time streaming video communication windows with respect to the physical distance of the object. The first expected eye gaze score for the first candidate presentation action composition may be resolved to exceed the second expected eye gaze score for a second candidate presentation action composition. Resolving can include determining, calculating, ascertaining, comparing, or formulating. The first candidate presentation action composition may be selected to customize the set of visual images with respect to the set of computer users.

For example, a video conferencing application on-screen window can include a sub-window video of a first user along with a sub-window video of a second that the first user is communicating with. Some users may have a habit of staring at their own video as opposed to making sustained eye contact with the video of the person that they are speaking with. For a first candidate presentation action composition, the presentation selection technique may automatically move or suggest to the first user to move the visual image of the first user picture closer to the physical location of the camera (e.g., eye gaze score of 89). For a second candidate presentation action composition, the presentation selection technique may indicate to resize the on-screen window of the first user but keep it on a second monitor at not nearer to the physical locations of the camera (e.g., eye gaze score of 43). By comparing/resolving the eye gaze scores, the presentation action composition expected to provide more performance or efficiency benefits may be selected.

In embodiments, the module management system 512 may include an automated fashion module 597. The operational steps (e.g., the detecting, the determining, the providing) described herein may be executed in an automated fashion without user intervention or manual action (e.g., using automated computer machinery, fully machine-driven without manual stimuli such as without a mouse click). The automated operational steps may be performed by a visual image management engine (e.g., as part of a browser, application, or display apparatus), or the like. In certain embodiments, the steps described herein may be performed in a dynamic fashion (e.g., real-time, ongoing, on-the-fly) to streamline (e.g., facilitate, promote, enhance) visual image management.

In embodiments, the module management system 512 may include a user intervention module 598. The operational steps (e.g., the detecting, the determining, the providing) described herein may be executed in response to user intervention or manual action (e.g., carrying-out a task in response to a user selection, with manual stimuli such as a gesture). In certain embodiments, the steps described herein may be performed with popup menus, slider bars, suggested actions for acquiescence, or the like for selection by a user for visual image management. In various embodiments, if a selection by a user is not made within a threshold temporal period, the operational steps may be carried-out in an automated fashion (e.g., as if the user had made that particular suggested selection).

In embodiments, the module management system 512 may include a particular environment module 591. The visual image management may be processed, carried-out, performed, or executed in various environments. The set of computer users may be in a same location (e.g., students all in same classroom) or different locations (e.g., students each at home). The set of visual images may be stored in a distributed cloud environment or on individual user computers. Various security settings, configurations, and arrangements may be utilized (e.g., for information protection purposes). Accordingly, aspects of the disclose may provide performance or efficiency benefits in various environments. Environments can include an education environment of any age or subject matter, a telehealth environment (e.g., pediatric telehealth to assist in children communicating or being diagnosed), users having various disabilities (e.g., permanent when a user is typical unable to manage visual images well, temporary when a user is struggling to communicate in a normal fashion for them), a construction/manufacturing environment (e.g., to limit the impact of distractions), a transportation environment (e.g., car, bus, train, plane, boat), a government environment (e.g., cross-cultural relationships), a business environment (e.g., when personal user familiarity with the other users may be lessened and eye contact even more beneficial), or in a military environment (e.g., when backgrounds may be fast-moving or information security is paramount and timely/concise communication is especially beneficial). Aspects may provide performance or efficiency benefits for visual image management (e.g., data communication reliability, speed, flexibility, responsiveness, productivity). Aspects may save resources such as bandwidth, disk, processing, or memory (e.g., storing less data, transferring less data).

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding of the various embodiments. But, the various embodiments may be practiced without these specific details. In other instances, well-known circuits, structures, and techniques have not been shown in detail in order not to obscure embodiments.

What is claimed is:

1. A computer-implemented method for visual image management associated with a set of visual images with respect to a set of computer users, the method comprising:
   detecting, using a computer pertaining to the set of visual images with respect to the set of computer users, a set of visual image features that relates to both the set of visual images and the set of computer users;
   determining, based on the set of visual image features that relates to both the set of visual images and the set of computer users, a set of display attributes to construct a presentation configuration associated with the set of visual images with respect to the set of computer users;
   providing, using the computer, the set of display attributes to construct the presentation configuration to display the set of visual images with respect to the set of computer users; and
   executing in an automated fashion without user intervention:
   the detecting, the determining, and the providing.

2. The method of claim 1, further comprising:
   detecting, with respect to a visual image capture device that relates to the set of computer users, a set of image capture arrangement features that relates to the visual image capture device;
   detecting, using the visual image capture device that relates to the set of computer users, a set of individual user disposition features that relates to the set of computer users; and
   determining, based on both the set of image capture arrangement features and the set of individual user disposition features, the set of display attributes to construct the presentation configuration associated with the set of visual images with respect to the set of computer users.

3. The method of claim 1, further comprising:
   generating, based on the set of visual image features that relates to both the set of visual images and the set of computer users, a set of candidate display attributes;
   constructing, using a presentation selection technique with respect to the set of candidate display attributes, the presentation configuration; and
   displaying, using the presentation configuration, the set of visual images with respect to the set of computer users.

4. The method of claim 2, further comprising:
identifying, using the set of individual user disposition features that relates to the set of computer users, a set of eye gaze parameters with respect to the set of computer users;
determining, based the on set of eye gaze parameters with respect to the set of computer users, the set of display attributes to construct the presentation configuration associated with the set of visual images with respect to the set of computer users; and
displaying, using the presentation configuration pertaining to the set of eye gaze parameters, the set of visual images with respect to the set of computer users.

5. The method of claim 4, further comprising:
ascertaining, to identify the set of eye gaze parameters with respect to the set of computer users, a first eye gaze angle with respect to a first object;
ascertaining, to identify the set of eye gaze parameters with respect to the set of computer users, a second eye gaze angle with respect to a second object;
determining, based on both the first eye gaze angle and the second eye gaze angle, the set of display attributes to construct the presentation configuration associated with the set of visual images with respect to the set of computer users; and
displaying, using the presentation configuration pertaining to both the first eye gaze angle and the second eye gaze angle, the set of visual images with respect to the set of computer users.

6. The method of claim 4, further comprising:
ascertaining, to identify the set of eye gaze parameters with respect to the set of computer users, an eye reflection factor associated with the set of visual images;
determining, based on the eye reflection factor associated with the set of visual images, the set of display attributes to construct the presentation configuration associated with the set of visual images with respect to the set of computer users; and
displaying, using the presentation configuration pertaining to the eye reflection factor, the set of visual images with respect to the set of computer users.

7. The method of claim 4, further comprising:
ascertaining, to identify the set of eye gaze parameters with respect to the set of computer users, an eye gaze quality assessment associated with the set of visual images;
determining, based on the eye gaze quality assessment associated with the set of visual images, the set of display attributes to construct the presentation configuration associated with the set of visual images with respect to the set of computer users; and
displaying, using the presentation configuration pertaining to the eye gaze quality assessment, the set of visual images with respect to the set of computer users.

8. The method of claim 2, further comprising:
identifying, using the set of individual user disposition features that relates to the set of computer users, a set of user relevance parameters with respect to the set of computer users;
determining, based on the set of user relevance parameters with respect to the set of computer users, the set of display attributes to construct the presentation configuration associated with the set of visual images with respect to the set of computer users; and
displaying, using the presentation configuration pertaining to the set of user relevance parameters, the set of visual images with respect to the set of computer users.

9. The method of claim 3, further comprising:
weighting, using the set of candidate display attributes, a set of presentation action compositions to customize the set of visual image features;
selecting, based on the set of presentation action compositions to customize the set of visual image features, the presentation configuration to customize the set of visual images with respect to the set of computer users; and
displaying, using the presentation configuration pertaining to the set of presentation action compositions, the set of visual images with respect to the set of computer users.

10. The method of claim 9, further comprising:
computing, using the set of candidate display attributes, a first expected eye gaze score for a first candidate presentation action composition which includes a first arrangement of real-time streaming video communication windows with respect to a physical distance of an object;
computing, using the set of candidate display attributes, a second expected eye gaze score for a second candidate presentation action composition which includes a second arrangement of real-time streaming video communication windows with respect to the physical distance of the object;
resolving that the first expected eye gaze score for the first candidate presentation action composition exceeds the second expected eye gaze score for a second candidate presentation action composition; and
selecting, for the presentation configuration in an automated fashion without user intervention, the first candidate presentation action composition to customize the set of visual images with respect to the set of computer users.

11. The method of claim 3, further comprising:
monitoring, with respect to the presentation configuration, the set of visual image features that relates to both the set of visual images and the set of computer users;
modifying, using the presentation selection technique with respect to the set of candidate display attributes, the presentation configuration; and
displaying, using the presentation configuration in response to modifying the presentation configuration, the set of visual images with respect to the set of computer users.

12. The method of claim 1, further comprising:
establishing an attentiveness mechanism to trigger user attention; and
constructing, using the attentiveness mechanism to trigger user attention, the presentation configuration.

13. The method of claim 12, further comprising:
detecting a triggering event which indicates achievement of a user attentiveness indicator; and
establishing, in response to detecting the triggering event, the attentiveness mechanism to trigger user attention.

14. The method of claim 13, further comprising:
configuring, using a machine-learning technique, the user attentiveness indicator; and
determining, based on the user attentiveness indicator, the attentiveness mechanism.

15. The method of claim 3, further comprising:
collecting, based on the set of visual image features that relates to both the set of visual images and the set of computer users, a set of user profiles; and generating, using the set of user profiles, the set of candidate display attributes.

16. The method of claim 15, further comprising:
updating, based on the set of visual image features that relates to both the set of visual images and the set of computer users, the set of user profiles;
analyzing, based on the set of visual image features that relates to both the set of visual images and the set of computer users, the set of user profiles to customize a modification; and
generating, in response to both updating the set of user profiles and analyzing the set of user profiles, a modified set of candidate display attributes.

17. The method of claim 1, further comprising:
processing the visual image management in a remote elementary education environment having a set of distributed child users.

18. The method of claim 1, further comprising:
processing the visual image management in a telehealth environment having a set of distributed telehealth users.

19. A computer system for visual image management associated with a set of visual images with respect to a set of computer users, the computer system comprising:
a memory having a set of computer readable program instructions, and
a processor for executing the set of computer readable program instructions, the set of computer readable program instructions comprising:
detecting, using a computer pertaining to the set of visual images with respect to the set of computer users, a set of visual image features that relates to both the set of visual images and the set of computer users;
determining, based on the set of visual image features that relates to both the set of visual images and the set of computer users, a set of display attributes to construct a presentation configuration associated with the set of visual images with respect to the set of computer users;
providing, using the computer, the set of display attributes to construct the presentation configuration to display the set of visual images with respect to the set of computer users; and
executing in an automated fashion without user intervention:
the detecting the determining, and the providing.

20. A computer program product for visual image management associated with a set of visual images with respect to a set of computer users, the computer program product comprising a computer readable storage medium having program instructions embodied therewith, wherein the computer readable storage medium is not a transitory signal per se, the program instructions executable by a processor to cause the processor to perform a method comprising:
detecting, using a computer pertaining to the set of visual images with respect to the set of computer users, a set of visual image features that relates to both the set of visual images and the set of computer users;
determining, based on the set of visual image features that relates to both the set of visual images and the set of computer users, a set of display attributes to construct a presentation configuration associated with the set of visual images with respect to the set of computer users;
providing, using the computer, the set of display attributes to construct the presentation configuration to display the set of visual images with respect to the set of computer users; and
executing in an automated fashion without user intervention:
the detecting the determining, and the providing.

* * * * *